US007661693B1

(12) United States Patent
Lipski

(10) Patent No.: US 7,661,693 B1
(45) Date of Patent: Feb. 16, 2010

(54) COMBINED VEHICLE TOW AND STEP ASSEMBLY

(76) Inventor: John A Lipski, P.O. Box 296, Webster, MA (US) 01570-0296

( * ) Notice: Subject to any disclaimer, the term of this patent is extended or adjusted under 35 U.S.C. 154(b) by 192 days.

(21) Appl. No.: 12/008,670

(22) Filed: Jan. 14, 2008

(51) Int. Cl.
*B60D 1/06* (2006.01)
(52) U.S. Cl. .................. 280/491.5; 280/164.1; 280/166
(58) Field of Classification Search ............. 280/491.3, 280/491.5, 416.1, 497, 166; 224/519, 524, 224/497
See application file for complete search history.

(56) References Cited

U.S. PATENT DOCUMENTS

| | | | | |
|---|---|---|---|---|
| 5,884,930 A | * | 3/1999 | Cluth | 280/497 |
| 6,234,512 B1 | * | 5/2001 | Bettenhausen | 280/491.1 |
| 6,511,086 B2 | * | 1/2003 | Schlicht | 280/166 |
| 6,682,086 B1 | * | 1/2004 | Erickson | 280/166 |
| 6,993,806 B2 | * | 2/2006 | Finley | 15/161 |
| 7,234,191 B2 | * | 6/2007 | Finley | 15/161 |
| 7,503,572 B2 | * | 3/2009 | Park et al. | 280/163 |
| 2003/0094472 A1 | * | 5/2003 | Knodle et al. | 224/509 |
| 2003/0116938 A1 | * | 6/2003 | Shields et al. | 280/166 |
| 2008/0100024 A1 | * | 5/2008 | Leitner et al. | 280/166 |
| 2009/0008896 A1 | * | 1/2009 | Phillips | 280/166 |
| 2009/0079157 A1 | * | 3/2009 | Fratzke | 280/166 |

* cited by examiner

*Primary Examiner*—Tony H. Winner
(74) *Attorney, Agent, or Firm*—Robert J Doherty

(57) ABSTRACT

A combined vehicle tow and step assembly in which a trailer hitch and step platform are interconnected with each other and function as a unit so as to provide both towing and step functions without the need of removal from the vehicle high mount to achieve such functions.

6 Claims, 12 Drawing Sheets

US 7,661,693 B1

COMBINED VEHICLE TOW AND STEP ASSEMBLY

FIELD OF THE INVENTION

This invention relates to a device or assembly that provides both a towing hitch and a step enabling users to more easily access vehicles such as the bed of a pickup truck end which may directly attach to a receiver hitch opening in the vehicle body.

BACKGROUND OF THE INVENTION

Many vehicles and primarily pickup trucks include beds and other areas that are difficult to access due to their relatively high height above the ground. Users often cannot step directly onto such surfaces from the ground and often stand on objects such as boxes or crates or initially sit on the lowered tailgate edge and then crawl up upon the tailgate. While there are a number of devices adapted to attach to the rear of a pickup truck vehicle and pivotally move to a use position from a storage position, these devices are either used in place of a tow assembly or interfere with the normal electrical connections often provided adjacent the receiver hitch opening of such vehicles.

Accordingly, an object of the present invention is to provide a combined trailer hitch and step platform assembly that can be attached to the vehicle and provide simultaneous towing capability and step assist to users.

Another object of the invention is the provision of a combined trailer hitch and step platform that is both easy to use and install and which also provides secure support when the step platform is positioned in the use position.

A still further object of the invention is the provision of a combined trailer hitch and step platform which can be easily modified by simply turning over the hitch-supporting member to an alternate position to position the trailer hitch connector ball at an alternate height with respect to the vehicle.

These and other objects of the invention are accomplished by a combination assembly comprising a trailer hitch and a step platform adapted for positioning at the rear of a vehicle, said assembly including a housing for interconnecting said trailer hitch and said step platform together, said trailer hitch including a tubular support member having a distal end and a proximal end wherein said distal end is adapted for connection to a receiver hitch on a vehicle body, said step platform including a step arm having a distal end and a proximal end wherein said step arm distal end is pivotally connected to said housing for pivotal movement between a storage position generally underneath to the vehicle and a use position in which the step arm extends outward from under the vehicle, and said step arm proximal end includes a foot rest where a user's foot may be placed when stepping into the vehicle.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
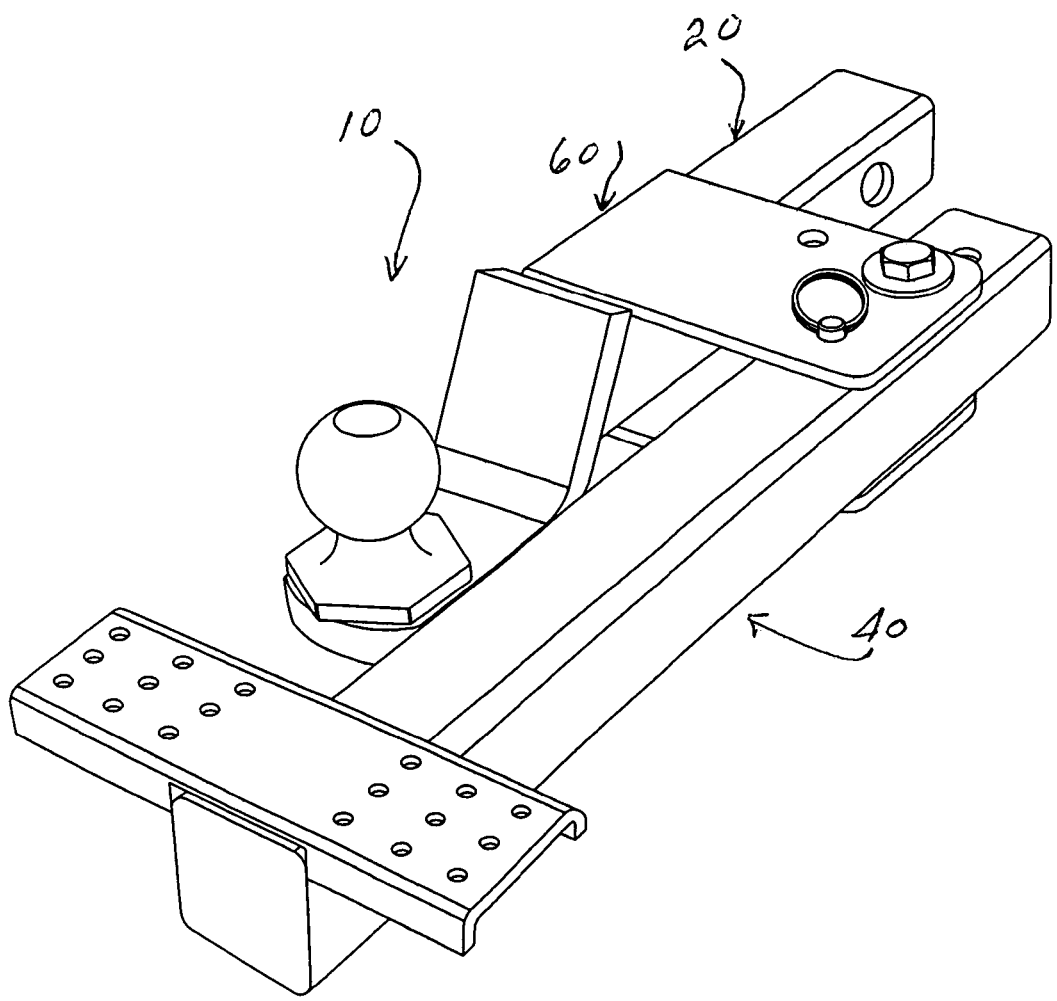
FIG. 1 is a front perspective view of one form of the present invention.
Figure 2:
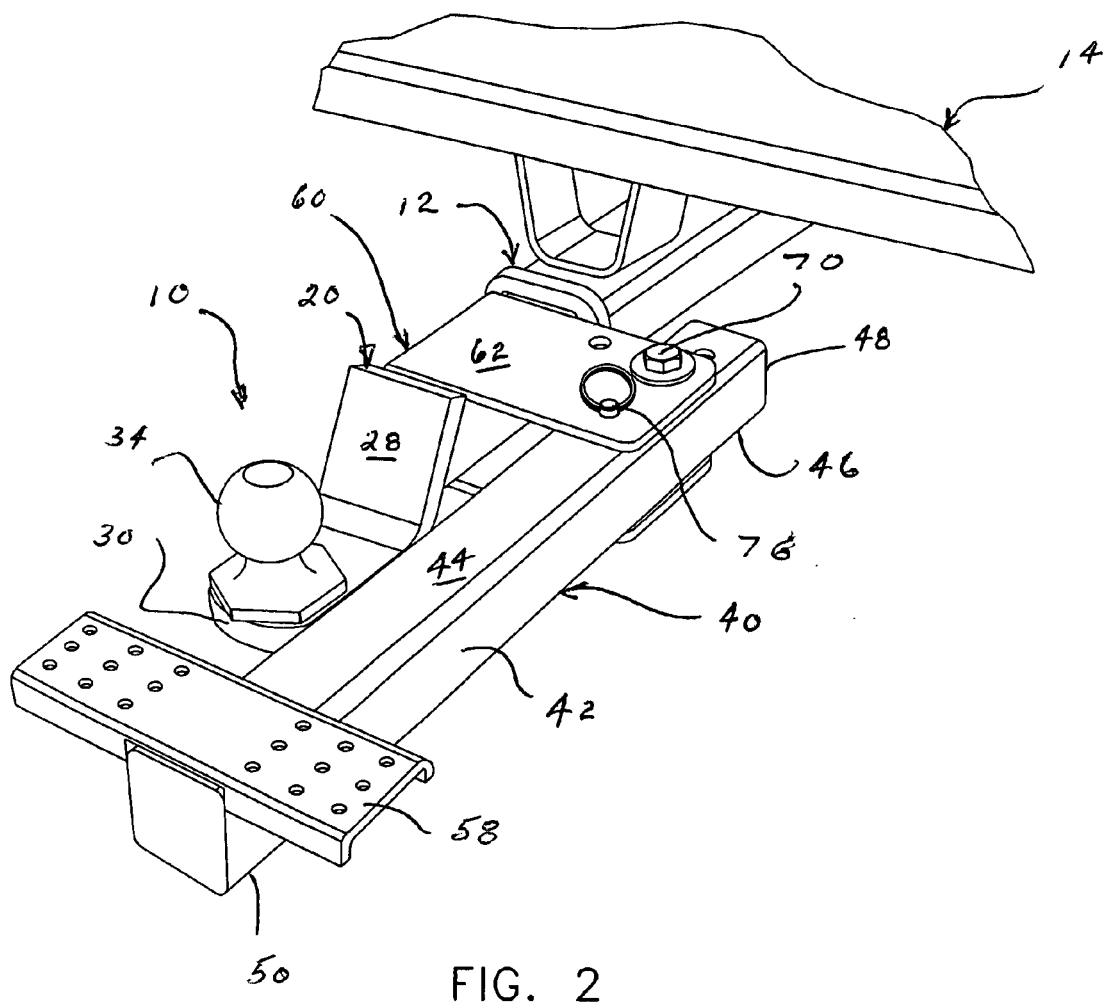
FIG. 2 is a front perspective view similar to FIG. 1 but showing the combined assembly attached to a vehicle receiver hitch.
Figure 3:
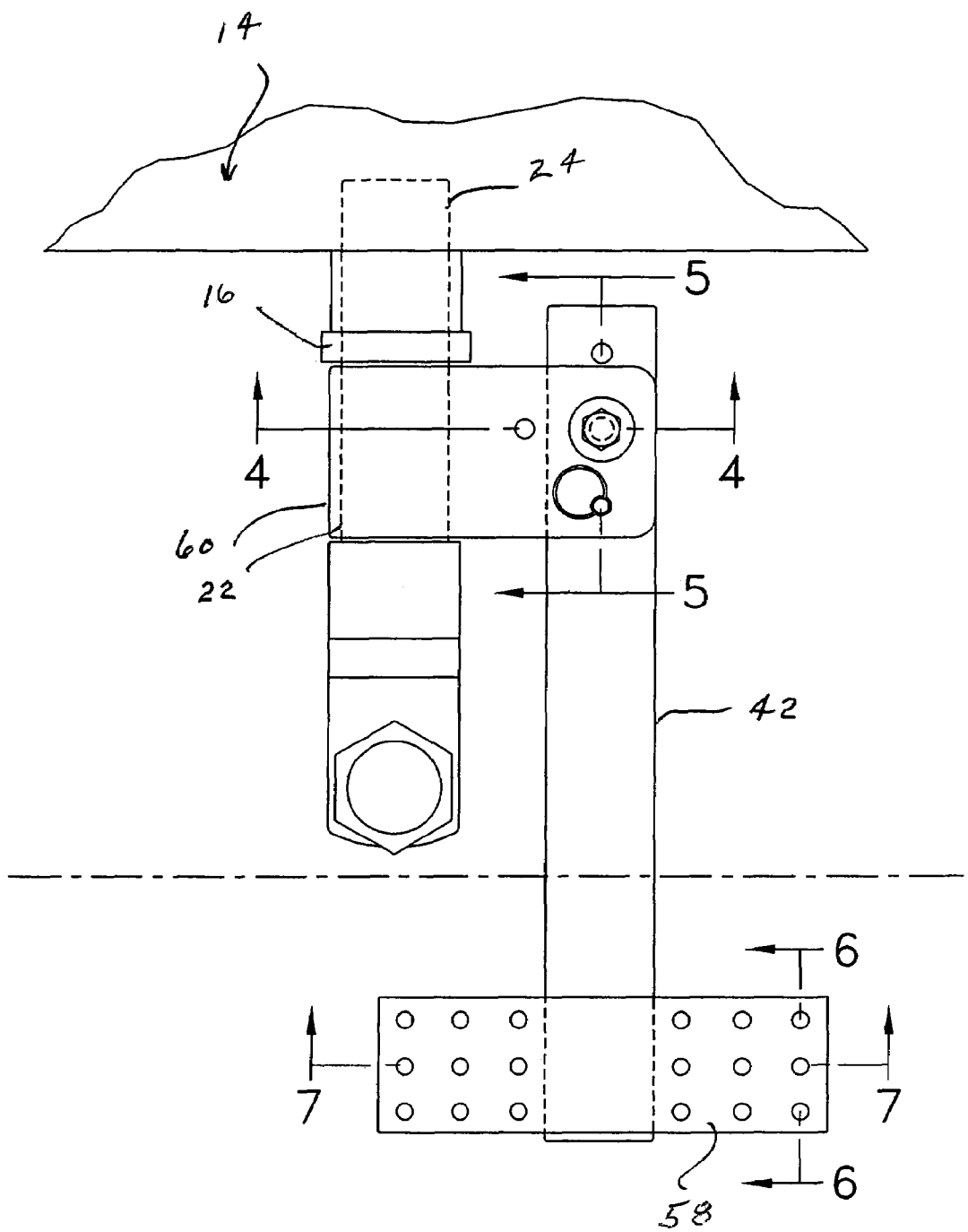
FIG. 3 is a top plan view of FIG. 2.
Figure 4:
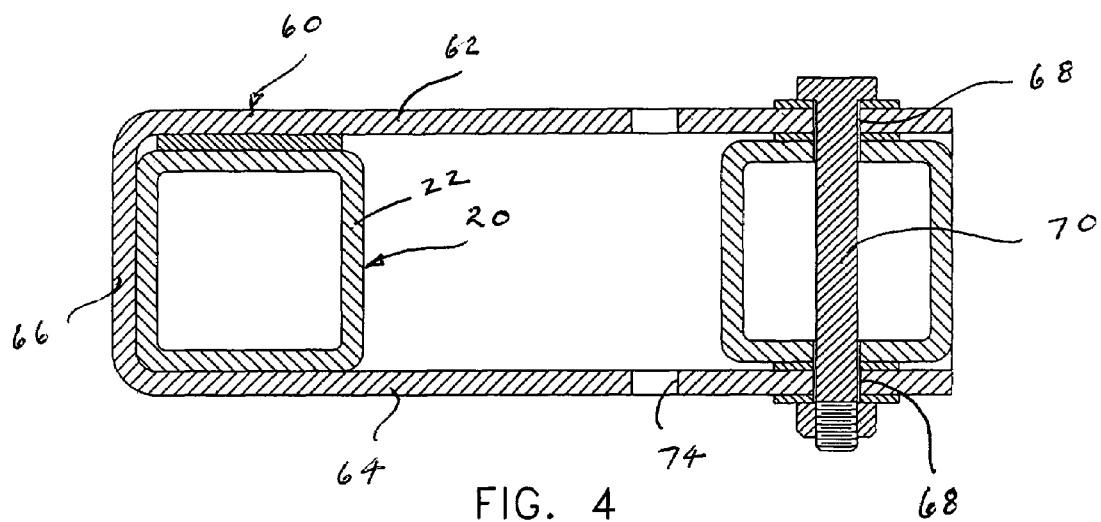
FIG. 4 is a cross-sectional view along the line 4-4 of FIG. 3.
Figure 5:
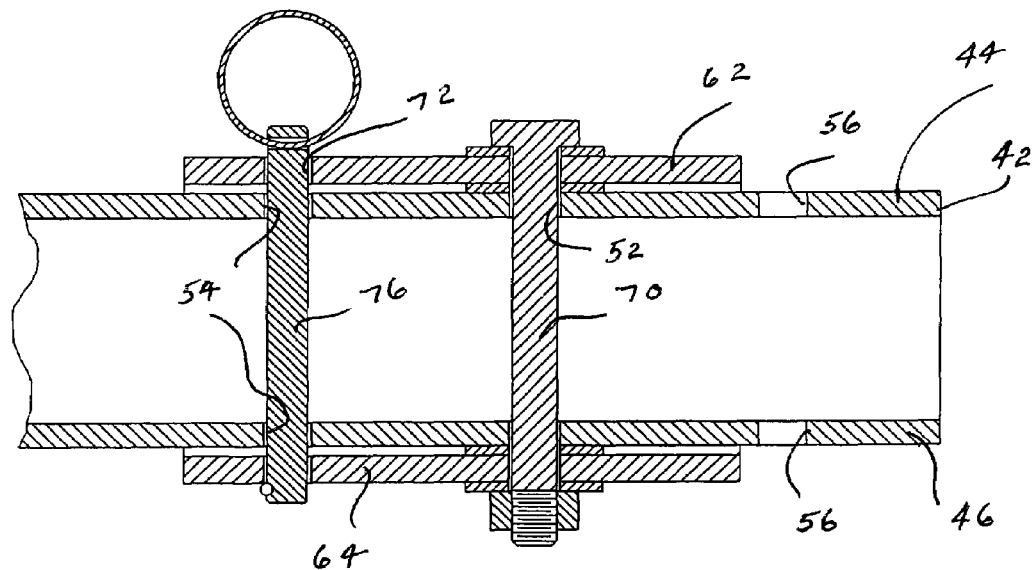
FIG. 5 is a cross-sectional view along the line 5-5 of FIG. 3.
Figure 6:
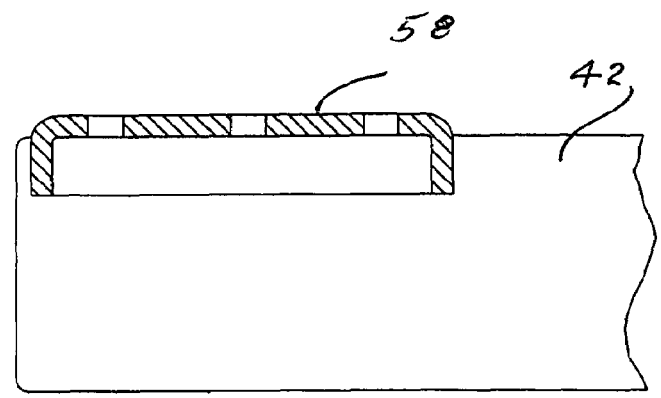
FIG. 6 is a cross-sectional view along the line 6-6 of FIG. 3.
Figure 7:
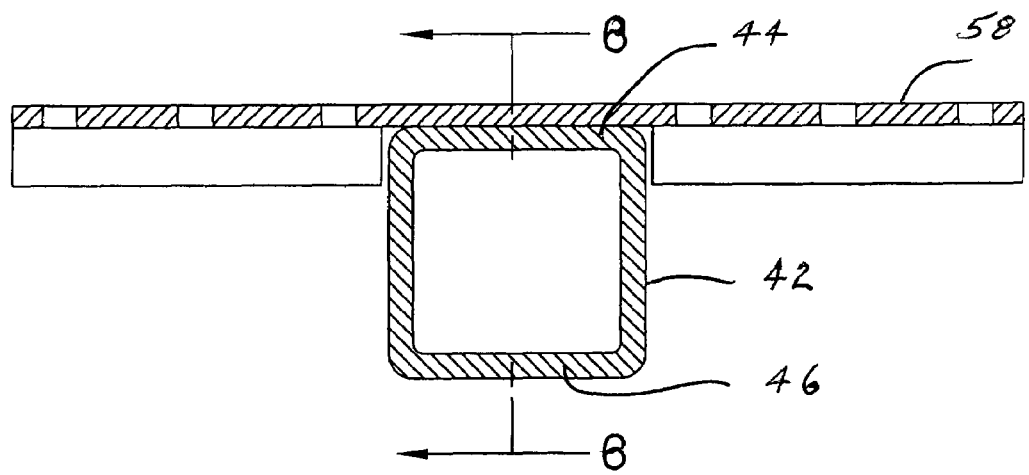
FIG. 7 is a cross-sectional view along the line 7-7 of FIG. 6.
Figure 8:
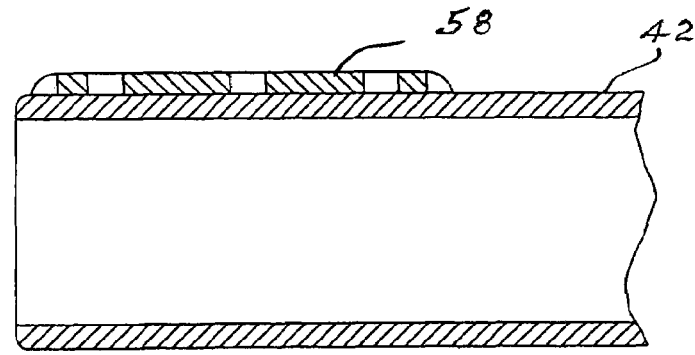
FIG. 8 is a cross-sectional view along the line 8-8 of FIG. 7.

The present invention is most useful when installed on a pickup truck or similar vehicle such as a sport utility vehicle having a tailgate that pivots from a vertical closed position to an open horizontal position that leads to the bed or other vehicle interior space. Such vehicles are usually equipped with a receiver hitch bracket centrally attached to the vehicle's rear frame. The bracket normally presents a connecting opening of square configuration for receipt of a tubular member having a trailer connector such as a ball and means for attaching the tubular member to the bracket.

Turning now to the drawings and particularly FIGS. 1-11 thereof, one form of the present invention is shown. The combined assembly 10 of the present invention is depicted attached to a standard receiver hitch 12 mounted at the rear of a vehicle 14 such as a pickup truck. The hitch 12 has a square-shaped opening 16 into which a similarly shaped tubular support member is inserted and is fixed in position by a pin (not shown) or other standard means.

The combined assembly 10 includes both a trailer hitch portion 20 and a step platform portion 40 effectively connected to each other by means of a housing portion 60. The housing 60 includes upper and lower generally parallel plates 62, 64 respectively. Such housing 60 may include a base 66 to which the plates are connected to form a generally U-shaped housing 60. The plates are each provided with a pivot pin opening 68. Such openings are vertically aligned with each other and are adapted to receive a pivot pin 70 therethrough for pivotal connection with the step platform portion 40 as will hereinafter be apparent. In addition, the plates each include a pair of spacially separated positioning front and rear openings 72, 74. Each of such opening pairs are also vertically aligned and are adapted to receive a locking or positioning pin 76 therethrough so as to fix the step platform 40 in either an extended use position or in a storage position with respect to the housing and thus with respect to the vehicle as will hereinafter become apparent. Generally in the embodiment shown in FIGS. 1-11, the plates are welded or otherwise permanently attached to the trailer hitch portion 20.

The trailer hitch portion comprises a tubular support member 22 having a distal end 24 of square configuration for receipt by the opening 16 of the hitch 12. A pair of locking openings 26 may be provided at the distal end 24 such that a pin (not shown) may be utilized to lock the support member 22 to the hitch 12. The support member 22 could alternatively be permanently attached to the hitch 12 as by welding, but such, while operable for most purposes, would enable the assembly to be rotated 180 degrees and reinserted into the hitch to position the assembly in an alternate use position as will also hereinafter become apparent.

The tubular support member proximal end 27 includes a hitch connector member 28 connected thereto as by welding and which member 28 downwardly slants and terminates in a forwardly projecting plate 30 having an opening 32 for receipt of a standard receiving ball 34 such that a trailer can be attached thereto as is known in the prior art. The ball 34 has a threaded lower post (not shown) that projects through the opening 32 and is thus connected to the plate via a nut (not shown).

The step platform 40 includes a step bar arm 42 preferably of similar square tubular configuration as the support member 22 and spaced upper and lower walls 44, 46 as well as a distal end 48 and a proximal end 50. The distal end is provided with a pair of vertically aligned pivot holes 52 extending through the walls 44, 46 for receipt of the pivot pin 70 to, in effect, attach the step platform 40 to the housing 60. The upper and lower walls 44, 46 are also provided with a pair of forward and rearward openings 54, 56 that are vertically aligned with each other. The forward pair 54 is positioned in front of the pivot holes 52 and the rearward pair 56 positioned to the rear thereof. The proximal end 50 includes a foot rest 58 fixedly attached to the upper surface of the upper wall 44 and provides a step such that the user may support his/her foot as when stepping up to the bed or other interior surface of the vehicle to which the assembly 10 is attached and when the step bar 42 of such assembly is in the extended use position shown in FIGS. 1-3.

Figure 9:
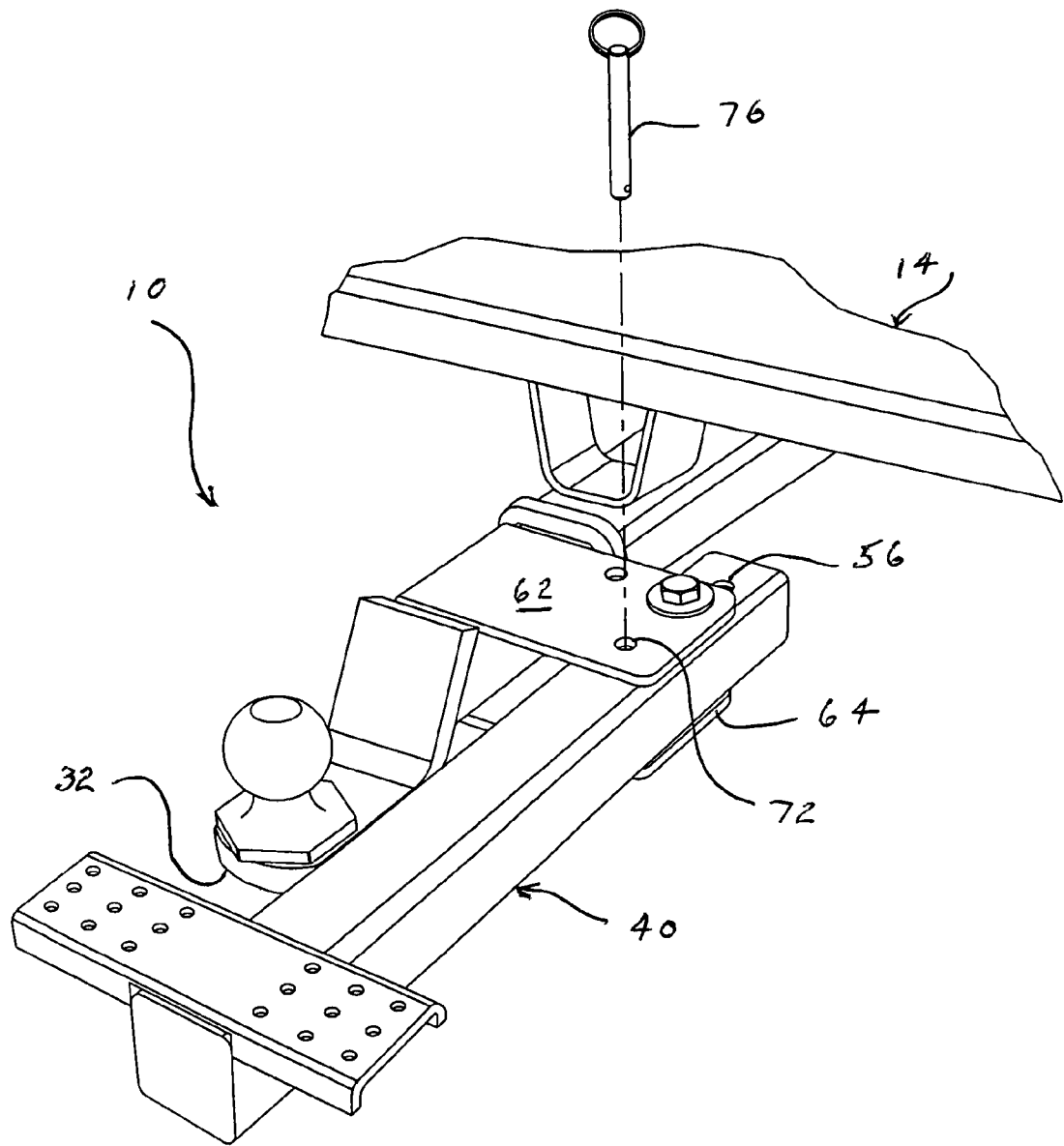
FIG. 9 is a front perspective view similar to FIG. 2 with the holding pin of the step bar removed in preparation to rotate the step arm to a non-use or storage position.
Figure 10:
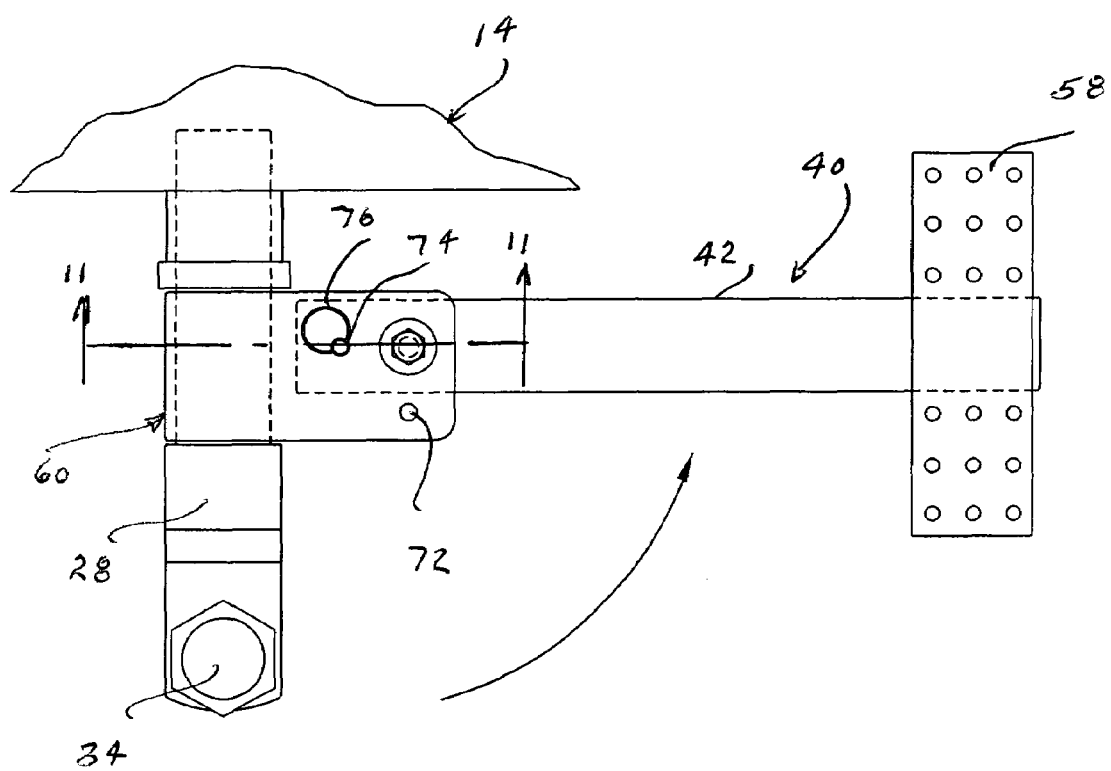
FIG. 10 is a top perspective view of the assembly shown in FIG. 9 but with the step arm rotated to the step arm's non-use or storage position.
Figure 11:
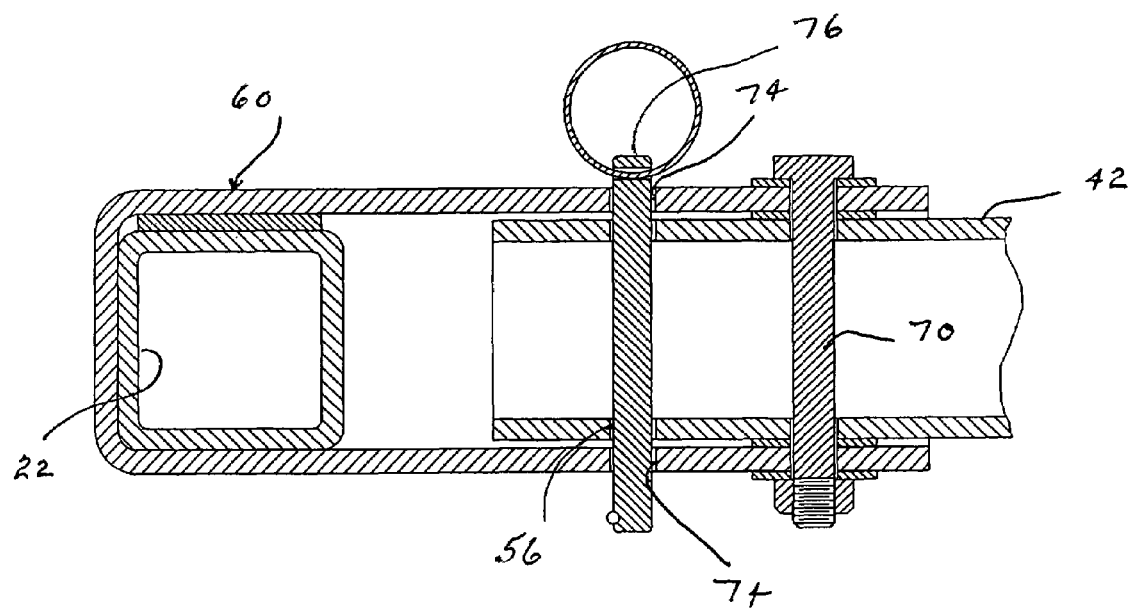
FIG. 11 is a sectional view along the line 11-11 of FIG. 10.
Figure 12:
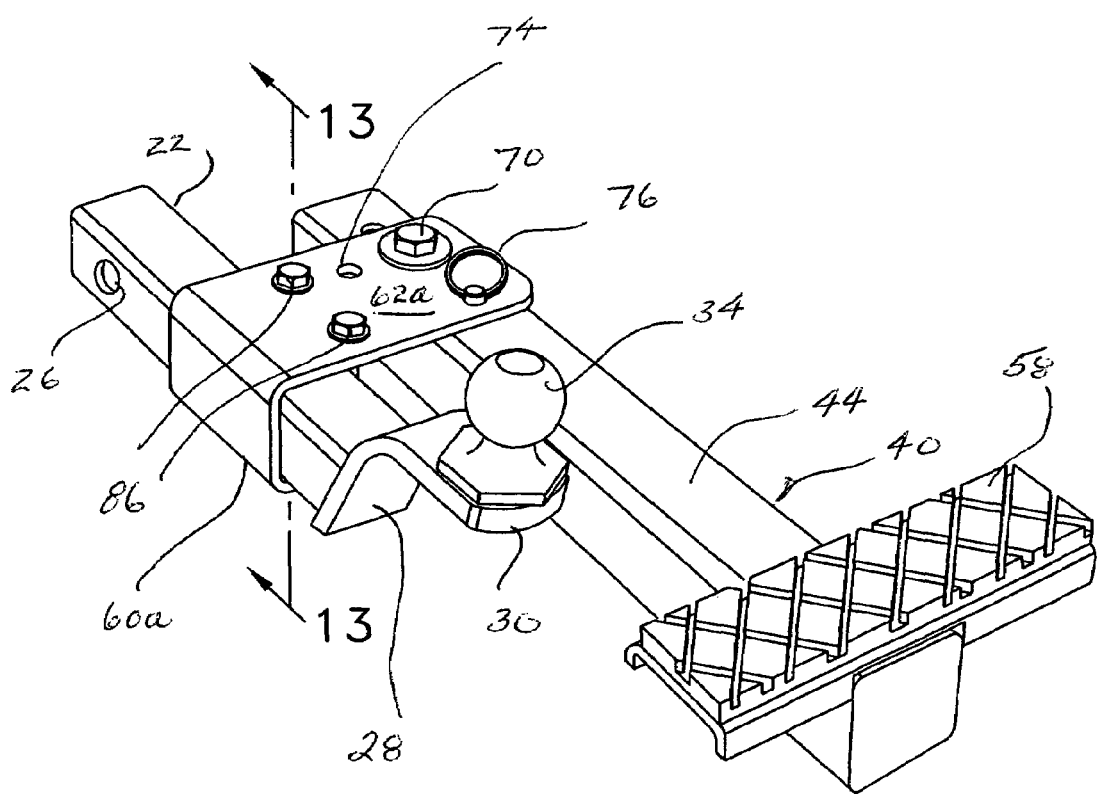
FIG. 12 is a front perspective view of a modified form of the invention shown in FIGS. 1-11.
Figure 13:
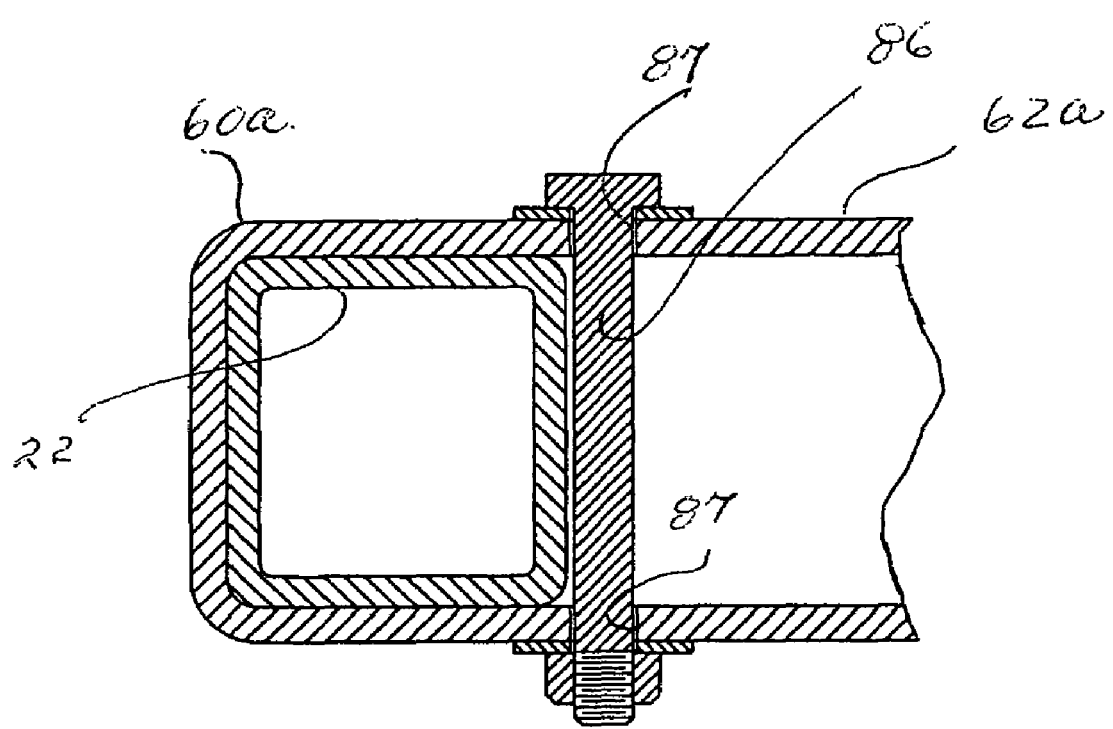
FIG. 13 is a sectional view along the line 13-13 of FIG. 12.
Figure 14:
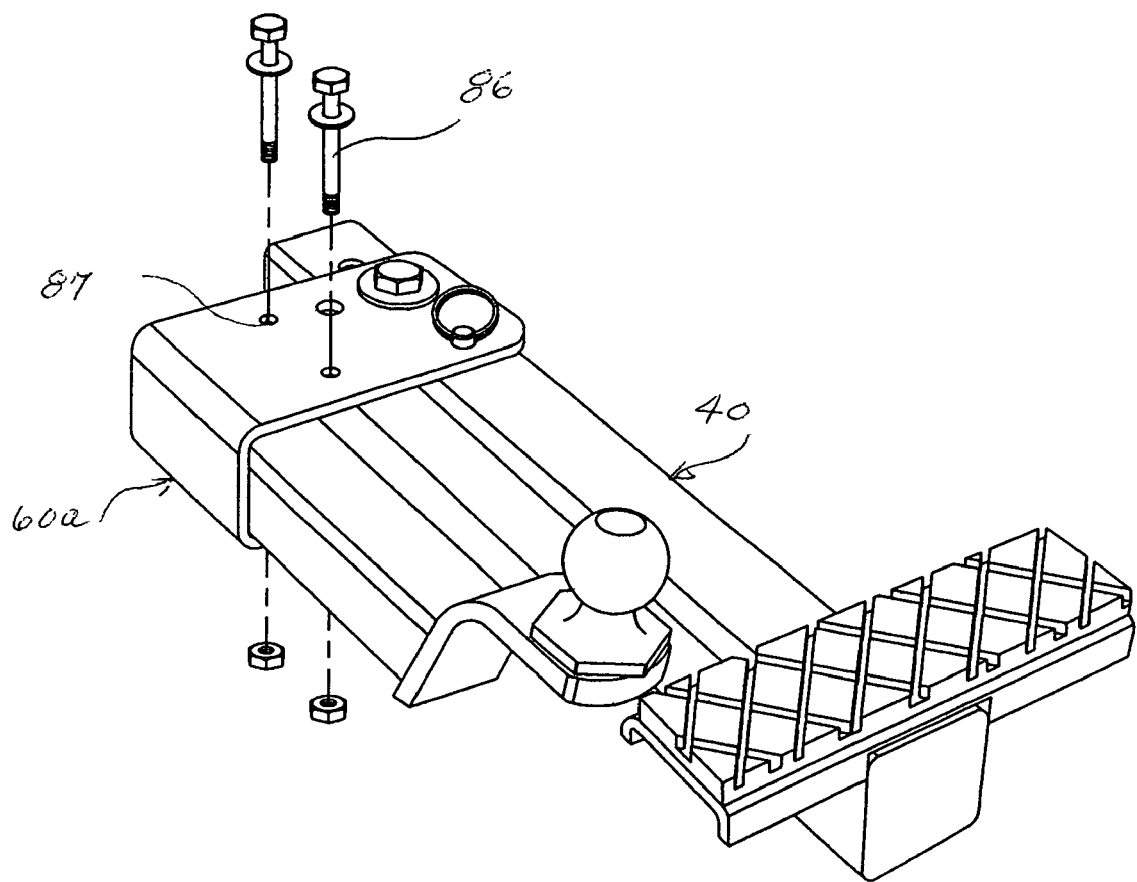
FIG. 14 is a view similar to FIG. 12 showing the removal of the trailer hitch tubular support member or arm.
Figure 15:
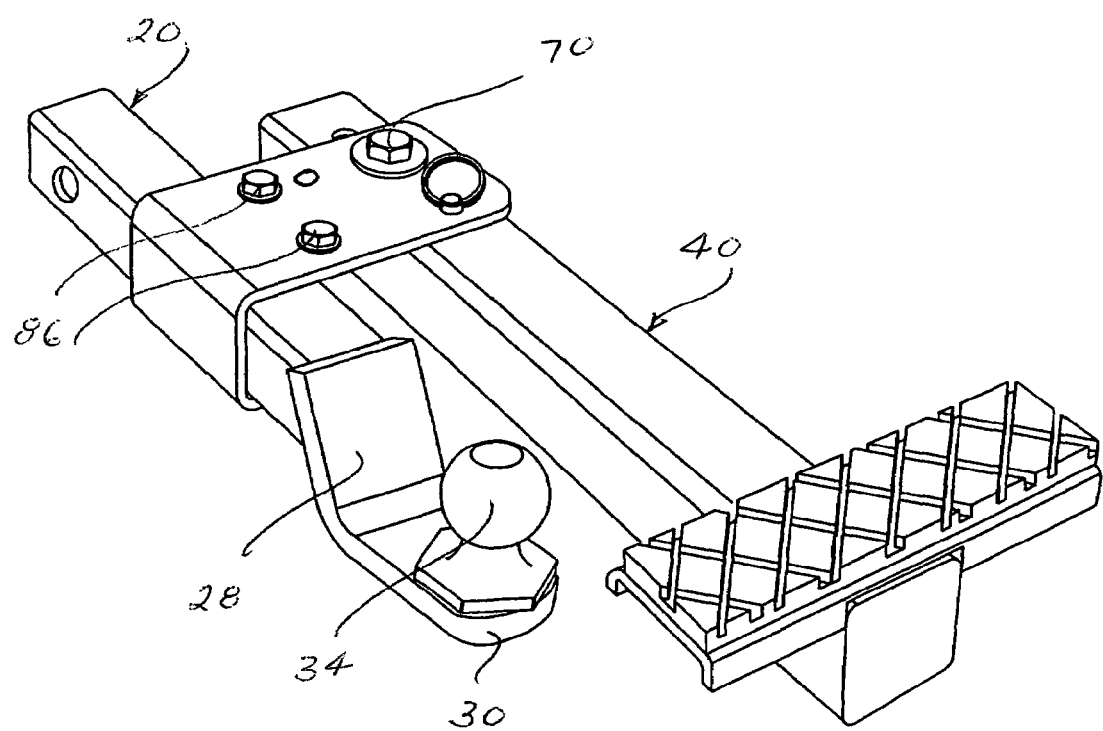
FIG. 15 is a view similar to FIG. 14 but showing the trailer hitch rotated 180 degrees and reconnected to the housing in order to position the hitch ball in a lower position with respect to the vehicle.

In such extended use position, the proximal end of the step bar and thus the footrest extends beyond, that is, forward of the tailgate in the tailgate's horizontal position and the step bar arm 42 and the hitch support member 22 are generally positioned parallel to each other. In this position, the positioning or locking pin 76 extends though the forward pair of openings 72 and the forward pair of openings 54 of the step bar arm 42. When the pin 76 is removed, the step bar arm may be pivoted to its storage position where the arm 42 is generally perpendicular to the hitch support member as shown in FIGS. 9-11. The step bar arm may be locked in this storage position by placing the pin 76 through the rear pair of openings 74 of the housing plates 62, 64 as well as the rearward openings 56 in the upper and lower walls 44, 46 of the step bar.

In an alternate positioning of the assembly 10, the tubular support member 22 of the trailer hitch portion is removed from the receiver hitch 12 and the entire assembly rotated 180 degrees and then the support member 22 reinserted into the hitch 12 in such inverted position where the housing plates 62, 64 will extend to the left of the receiver hitch 12 as opposed to the right as shown in the drawings. In this alternate position, the forwardly projecting plate 30 due to the slant of the hitch connector member 28 will place the receiving ball 34 at a higher alternate level with respect to the vehicle so as to give some flexibility as to the tow height for different weight and sized trailers. The receiving ball 34 must be removed from the opening in the plate 30 and then reinserted right side up, that is, with the ball positioned above the plate. It should also be noted, however, that many vehicle hitch connections provide electrical receptacles on the vehicle for connecting wiring, i.e., braking, turning and running lights, and that such outlets or trailer plugs are conventionally placed to the left of the receiver hitch opening. In such cases, it, therefore, may be useful to provide an alternate embodiment to avoid such potential access problem.

Such alternate embodiment 10a is shown in FIGS. 12-15 of the drawings and includes the same structural features of the FIGS. 1-11 embodiment and with the same reference numerals attached thereto except that the housing 60a includes a separate U-shaped member having upper and lower plates 62a, 64a connected to each other by a base 66a. In order to attach the housing 60a to the tubular support member 22, a pair of threaded bolts 86 which are adapted to pass through a set of vertically aligned holes 87 provided in both plates 62a and Ma of the housing 60a. Nuts are provided for the bolts 86 and, when tightened, serve to draw the plates together so as to clamp the support bar 22 tightly therebetween. This tightening action thus serves to fix the position of the housing and thus the step assembly which is attached to the housing in place. Once connected, the assembly 10a functions the same as the assembly 10 previously described above. When, however, it is desired to change the height of the connecting ball to accommodate different height trailers, the trailer hitch 20 is removed from the housing 60a by removing the bolts 86. The trailer hitch bar 22 is then inverted in position (turned 180 degrees), reassembled in position with the housing 60 and the bolts 86 reinserted in position and tightened so as to fix the bar and housing in the position shown in FIG. 15 when the ball hitch is in its lower position. In addition, the connecting ball, as in the previous embodiment, must be removed and then reinserted right side up into the opening 32 in the plate 30. The above outlined procedures reflect the changed position of the hitch member from a higher ball position shown in FIG. 12 to a lower ball position shown in FIG. 15. The construction of the alternate embodiment thus provides height adjustment of the connection ball without placing any portion of the assembly 10a to the left of the receiver opening of the hitch 12 and thus would not prevent access to the electrical connections placed in that position.

In addition, it should be pointed out that, if desired, the welding attachment of the housing 60 to the hitch bar 22 shown in the FIGS. 1-11 embodiment can be changed to the bolt attachment arrangement shown in the FIGS. 12-15 alternate embodiment.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A combination assembly comprising a trailer hitch and a step platform adapted for positioning at the rear of a vehicle, said assembly including a housing for interconnecting said trailer hitch and said step platform together, said trailer hitch including a tubular support member having a distal end and a proximal end wherein said distal end is adapted for connection to a receiver hitch on a vehicle body, said step platform including a step arm having a distal end and a proximal end wherein said step arm distal end is pivotally connected to said housing for pivotal movement between a storage position generally underneath the vehicle and a use position in which the step arm extends outward from under the vehicle, and said step arm proximal end includes a foot rest where a user's foot may be placed when stepping into the vehicle, said housing is a generally U-shaped member having a base and upper and lower generally parallel plates outwardly extending therefrom, said plates supporting pivotal connection means for connecting said step arm distal end to said housing and step arm locking means for locking said step arm in either the step arm's said storage or use positions, said trailer hitch support member positioned against the base of said housing member end between the plates thereof and means for attaching said support member to said housing.

2. The assembly of claim 1, said trailer hitch support member including a hitch connector member downwardly disposed from said trailer hitch support member proximal end and in turn terminating in a connector ball flange in turn disposed at a different vertical height than that of the trailer hitch support member.

3. The assembly of claim 2, said trailer hitch support member adapted for alternate 180 degrees positioning between said plates so as to position said connector ball flange at alternate higher and lower levels, and said attaching means for connecting said trailer hitch support member to said housing being detachable from said flanges.

4. The assembly of claim 3, said attaching means for attaching said trailer hitch support arm to said housing comprising vertically aligned holes in said flanges and the upper and lower walls of said support arm and a pin insertable through said aligned holes to lock said support arm to said housing in one or the other of said alternate positions.

5. The assembly of claim 1, said trailer hitch support member being hollow and having upper and lower walls and said housing plates having vertically aligned step bar positioning holes at different arcuate positions therein as well as pivotal positioning holes also vertically aligned through said housing plates for receipt of a pivot pin through said pivotal positioning holes and a pair of pivotal positioning holes vertically aligned through the upper and lower walls of said support arm so as to enable said step bar arm to pivot between said storage and use positions.

6. The assembly of claim 1, said trailer hitch tubular support member being of a square cross-sectional configuration.

\* \* \* \* \*